G. H. AUPPERLE & J. C. WALDO.
CORD OR ROPE HITCH.
APPLICATION FILED NOV. 21, 1911.

1,119,773.

Patented Dec. 1, 1914.

Witnesses

Inventors
George H. Aupperle
J. C. Waldo
By C. L. Parker
Attorney

UNITED STATES PATENT OFFICE.

GEORGE H. AUPPERLE AND JAMES C. WALDO, OF SHARPSBURG, PENNSYLVANIA.

CORD OR ROPE HITCH.

1,119,773.  Specification of Letters Patent.  Patented Dec. 1, 1914.

Application filed November 21, 1911. Serial No. 661,517.

*To all whom it may concern:*

Be it known that we, GEORGE H. AUPPERLE and JAMES C. WALDO, citizens of the United States, residing at Sharpsburg, in the county of Allegheny and State of Pennsylvania, have invented certain new and useful Improvements in Cord or Rope Hitches, of which the following is a specification.

The present invention relates to a cord or rope hitch.

An important object of this invention is to provide a device of the above mentioned character so constructed that a cord or rope may be quickly and easily attached to the same so that it will not slip and may be removed therefrom when desired.

A further object of this invention is to provide a cord or rope hitch, which is simple in construction, and cheap to manufacture.

Other objects and advantages of this invention will be apparent during the course of the following description.

Figure 1:
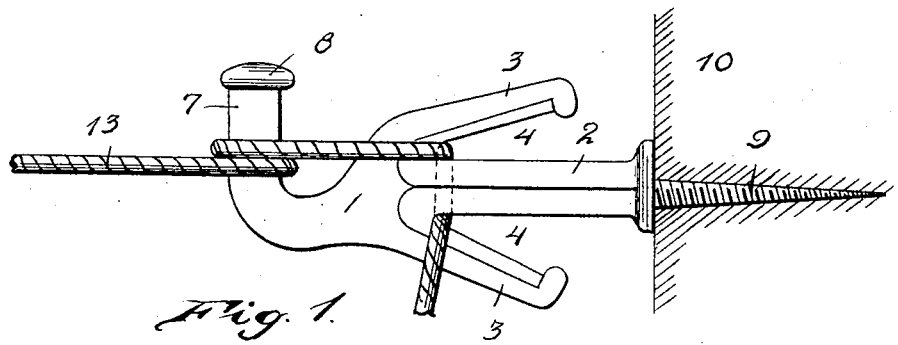
Figure 2:
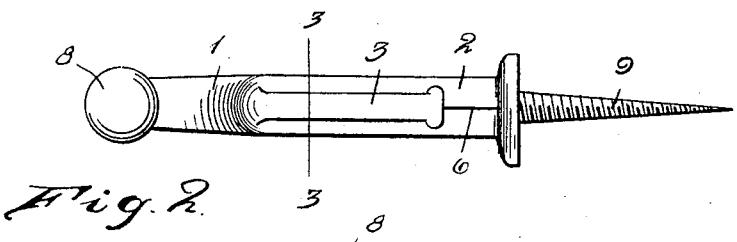
Figure 3:
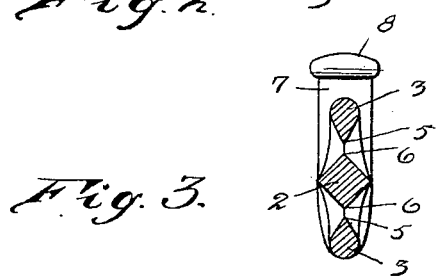
Figure 4:
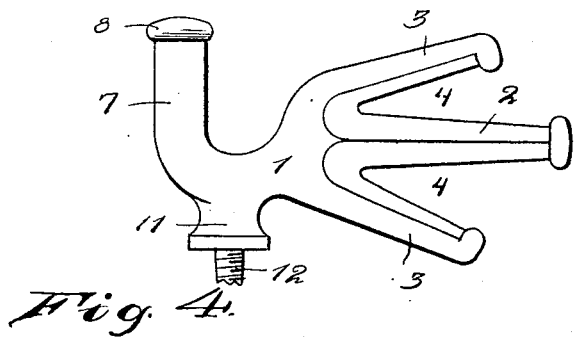

In the accompanying drawings forming a part of this specification and in which like numerals are employed to designate like parts throughout the same, Figure 1 is a side elevation of the device, Fig. 2 is a plan view of the same, Fig. 3 is a section taken on the line 3—3 of Fig. 2, and, Fig. 4 is a side elevation of a slightly different form of the device.

In the drawings wherein is illustrated a preferred embodiment of our invention, the numeral 1 designates the body portion of the hitch, upon which is formed an intermediate rearwardly extending substantially horizontal tine 2, preferably square in cross-section, as shown. Formed upon the body portion 1 upon opposite sides of the intermediate tine 2 are outer tines 3, extending rearwardly and disposed at angles to the tine 2, to form wedge-shaped openings 4. The tines 3 have preferably the shape in cross-section, as shown in Fig. 3, to provide gripping edges 5, to coöperate with gripping edges 6 of said intermediate tine 2. Formed upon the body portion 1 is a forwardly and upwardly extending securing lug or post 7, preferably provided at its upper end with an enlarged head 8, as shown. In the form of the invention shown in Figs. 1 to 3, inclusive, the intermediate tine 2 is provided with a securing screw 9, adapted to enter a fixed support 10.

The form of our invention shown in Fig. 4 is like that shown in Figs. 1 to 3, inclusive, except that the lower portion of the securing lug 7 is provided with a depending lug or boss 11 upon which is formed a securing screw 12. The intermediate tine 2 is not provided with the screw 8, as shown. In the use of the device it is secured to a fixed support and a cord or rope 13 is first wrapped about the securing lug 7 and the free end of the element 13 is then carried back and passed through the openings 4, to assume the position shown in Fig. 1. It is thus seen that when a pull is exerted on the cord or rope 13 the turn of the rope about the securing lug 7 will be tightened and the rope will not slip, it being understood that the free end of this rope is prevented from slipping by being clamped in the small ends of the opening 4 between the edges 5 and 6 of the tines, as above stated.

We wish it understood that the forms of our invention herewith shown and described are to be taken as preferred examples of the same and that certain changes in the shapes, sizes, and arrangements of parts may be resorted to without departing from the spirit of the invention or the scope of the subjoined claim.

Having thus described our invention, we claim:—

A flat cord or rope hitch comprising a body portion, carrying at one end inner and outer longitudinally extending tines and at its opposite end a laterally extending binding post, the body portion, tines, and binding post being all arranged in the same plane, the outer tines being arranged at an angle to the inner tine and diverging toward the rear end of the inner tine and terminating at a point spaced a substantial distance from the rear end of the inner tine and being free from connection therewith, to provide triangular openings having their bases open and the inner tine extending beyond the same for a substantial distance, and an attaching element secured to the rear end of the inner tine.

In testimony whereof we affix our signatures in presence of two witnesses.

GEORGE H. AUPPERLE.
JAMES C. WALDO.

Witnesses:
J. S. STRAWN,
T. E. L. WHITESELL.

Copies of this patent may be obtained for five cents each, by addressing the "Commissioner of Patents, Washington, D. C."